United States Patent
Hessling-Von Heimendahl et al.

(10) Patent No.: US 10,836,506 B2
(45) Date of Patent: Nov. 17, 2020

(54) EXTERIOR AIRCRAFT LIGHT, AIRCRAFT WING COMPRISING THE SAME, AND METHOD OF OPERATING AN EXTERIOR AIRCRAFT LIGHT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE); Marion Depta, Lippstadt (DE); Norbert Menne, Paderborn (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/564,506

(22) Filed: Sep. 9, 2019

(65) Prior Publication Data
US 2020/0094988 A1 Mar. 26, 2020

(30) Foreign Application Priority Data
Sep. 21, 2018 (EP) .................................... 18196040

(51) Int. Cl.
| | |
|---|---|
| *B64D 47/06* | (2006.01) |
| *B64C 23/06* | (2006.01) |
| *F21S 43/14* | (2018.01) |
| *F21V 9/40* | (2018.01) |
| *F21Y 115/10* | (2016.01) |
| *F21W 103/10* | (2018.01) |

(52) U.S. Cl.
CPC ............ *B64D 47/06* (2013.01); *B64C 23/072* (2017.05); *F21S 43/14* (2018.01); *F21V 9/40* (2018.02); *B64D 2203/00* (2013.01); *F21W 2103/10* (2018.01); *F21Y 2115/10* (2016.08)

(58) Field of Classification Search
CPC ........ B64D 47/06; B64C 23/072; F21S 43/14; F21V 9/40
USPC ......................................................... 362/470
See application file for complete search history.

(56) References Cited

U.S. PATENT DOCUMENTS

| | | | | |
|---|---|---|---|---|
| 5,381,986 A | * | 1/1995 | Smith | ...................... B64C 3/56 |
| | | | | 244/49 |
| 5,988,563 A | * | 11/1999 | Allen | ....................... B64C 3/42 |
| | | | | 244/49 |
| 9,296,471 B2 | | 3/2016 | Sakurai et al. | |
| 9,517,834 B2 | | 12/2016 | Thompson | |
| 9,950,811 B2 | * | 4/2018 | Seibt | ...................... B64D 47/02 |

(Continued)

FOREIGN PATENT DOCUMENTS

| | | |
|---|---|---|
| CN | 205931234 U | 2/2017 |
| EP | 3335985 A1 | 6/2018 |

OTHER PUBLICATIONS

Extended European Search Report for International Application No. 18196040.2 dated Mar. 4, 2019, 9 pages.

*Primary Examiner* — Bryon T Gyllstrom
(74) *Attorney, Agent, or Firm* — Cantor Colburn LLP

(57) ABSTRACT

An exterior aircraft light for indicating a movement of a foldable wing tip between a folded up position and a laterally extended position includes a light source; and a control unit; wherein the control unit is configured to operate the light source to emit a warning light output in response to a warning light control signal indicative of the movement of the foldable wing tip.

18 Claims, 8 Drawing Sheets

(56) References Cited

U.S. PATENT DOCUMENTS

| | | | |
|---|---|---|---|
| 2009/0182506 A1* | 7/2009 | Yun | G08G 5/0021 |
| | | | 701/301 |
| 2010/0084516 A1* | 4/2010 | Eberhardt | B64C 3/54 |
| | | | 244/218 |
| 2014/0117151 A1* | 5/2014 | Fox | B64C 23/072 |
| | | | 244/49 |
| 2015/0097087 A1* | 4/2015 | Sakurai | B64C 9/00 |
| | | | 244/201 |
| 2015/0108283 A1* | 4/2015 | Thoreen | B64C 13/04 |
| | | | 244/234 |
| 2015/0298793 A1* | 10/2015 | Fox | B64C 3/56 |
| | | | 244/49 |
| 2016/0090170 A1* | 3/2016 | Thompson | B64D 45/0005 |
| | | | 701/3 |
| 2016/0244146 A1* | 8/2016 | Harding | B64C 3/56 |
| 2016/0244153 A1* | 8/2016 | McMahon | B64C 5/08 |
| 2019/0300201 A1* | 10/2019 | Edwards | B64C 23/072 |

* cited by examiner

EXTERIOR AIRCRAFT LIGHT, AIRCRAFT WING COMPRISING THE SAME, AND METHOD OF OPERATING AN EXTERIOR AIRCRAFT LIGHT

FOREIGN PRIORITY

This application claims priority to European Patent Application No. 18196040.2 filed Sep. 21, 2018, the entire contents of which is incorporated herein by reference.

TECHNICAL FIELD

The present invention is in the field of exterior aircraft lighting. In particular, it relates to an exterior aircraft light and to a method of operating an exterior aircraft light for indicating a particular operation of the aircraft.

BACKGROUND

Almost all aircraft are equipped with exterior lighting systems. For example, large commercial aircraft have many different exterior lights. An exemplary group of exterior aircraft lights are lights for passive visibility and signalling, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

As laid out above, modern aircraft already contain various signalling lights for enhancing operating safety, both during flight and on the ground. However, it is not always clear to ground personnel and/or other aircraft on an airfield how a particular aircraft may behave or what operations it may carry out. Accordingly, it would be beneficial to provide an exterior aircraft light that enhances operating safety on an airfield. It would further be beneficial to provide a method of operating an exterior aircraft light that enhances operating safety on the airfield.

SUMMARY

Exemplary embodiments of the invention include an exterior aircraft light for indicating a movement of a foldable wing tip between a folded up position and a latterly extended position, comprising a light source; and a control unit; wherein the control unit is configured to operate the light source to emit a warning light output in response to a warning light control signal indicative of the movement of the foldable wing tip.

Exemplary embodiments of the invention allow for providing a visual signal that a foldable wing tip of an aircraft is moved between a folded up position and a latterly extended position. In this way, observers of the aircraft, such as ground personnel, pilots of other aircrafts, drivers of airfield vehicles, etc., are warned about a change in wingspan of the aircraft in question. In this way, the risk of collisions between aircraft or collisions between aircraft and airfield vehicles can be reduced. As the exterior aircraft light is configured to indicate a movement of a foldable wing tip between a folded up position and a laterally extended position, the exterior aircraft light may also be referred to as a wing tip movement warning light.

The exterior aircraft light is configured to indicate a movement of a foldable wing tip between a folded up position and a laterally extended position. This wording may encompass both moving directions of the foldable wing tip, i.e. a movement of the foldable wing tip from the folded up position to the laterally extended position and a movement of the foldable wing tip from the laterally extended position to the folded up position. It is also possible that the exterior aircraft light is configured to only indicate a movement of the foldable wing tip from the folded up position to the laterally extended position, thus reliably warning the observers of the aircraft with respect to an extension of the wing span.

The control unit is configured to operate the light source to emit a warning light output in response to a warning light control signal indicative of the movement of the foldable wing tip. The control unit may be any kind of control unit that is suitable to supply power to the light source in response to a warning light control signal that contains information about the movement of the foldable wing tip. In particular, the control unit may comprise a driver circuit that provides a suitable power flow to the light source in response to the warning light control signal. It is also possible that the control unit is configured to decode an elaborate warning light control signal and to provide suitable power flow to the light source, in case the decoded information indicates the movement of the foldable wing tip. The control unit may be implemented in hardware or in a combination of hardware and software, with the software for example being executed on a microprocessor.

The warning light output may be any kind of light output that draws attention to the aircraft being equipped with the exterior aircraft light in accordance with exemplary embodiments of the invention. In particular, the warning light output may differ from the light output of other exterior aircraft lights in color and/or light intensity over time. In this way, it may be prevented that the warning light output is confused with other signalling information as emitted by other exterior aircraft lights. In particular, the color of the warning light output may be different from white, red, and green, which are the colors used for navigation lighting, white strobe anti-collision lighting, and red flashing beacon lighting. The warning light output may have a particular warning light color and/or a particular sequence of light intensities over time, such as a sequence of warning light flashes.

The exterior aircraft light may further comprise an optical system for conditioning the light emitted by the light source. In this way, the warning light output may be directed towards areas of the airfield where the warning light output can reduce the risk of collisions in a particularly effective manner. The optical system may have one or more lenses and/or one or more reflectors and/or one or more shutters. Also, the exterior aircraft light may have a plurality of light sources. It may have one or more optical systems for shaping the light output of the plurality of light sources. The plurality of light sources may be any suitable number of light sources, such as two, three, four, five or six light sources.

The light source may be an LED. In this way, the warning light output may be provided in a particularly power-efficient manner. Also, the maintenance requirements for the exterior aircraft light may be kept low. The LED may be a colored LED, as will be explained below.

According to a further embodiment, the warning light output comprises a sequence of warning light flashes. In other words, the warning light output is a flashing light output. The term flashing light output refers to a sequence of light flashes, as perceived by the observer. In other words, the observer of a flashing light output perceives an intermittent light emission by the exterior aircraft light. In particular, the warning light output may comprise between 40 and 100 flashes per minute. The provision of a sequence of warning light flashes is particularly effective in drawing the observers' attention to the movement of the foldable wing tip between the folded up position and the laterally extended position.

According to a further embodiment, the warning light output is of an orange or yellow color. In this way, effective attention is drawn to the warning light output and, thus, to the movement of the foldable wing tip between the folded up position and the laterally extended position, without risking a confusion of the warning light output with the outputs of the aircraft navigation lights, the white strobe anti-collision lights, and the red flashing beacon lights. The terms orange and yellow refer to any kind of orangish or yellowish light. In particular, the terms orange and yellow refer to any kind of shade of orange or yellow color that is distinguishable from the colors of aviation red, aviation green, and aviation white, as used for aircraft navigation lighting. The light source may be an orange or yellow light source. It is also possible that the light source is a white light source and is provided with an orange or yellow light filter. In a particular embodiment, the exterior aircraft light is provided with an orange or yellow lens cover, conditioning the warning light output to be of orange or yellow color.

According to a further embodiment, the warning light control signal is indicative of a momentary orientation of the foldable wing tip and the control unit is configured to determine the movement of the foldable wing tip from the course of the warning light control signal over time. In this way, the exterior aircraft light may determine when to emit the warning light output in an autonomous manner, based on raw data on the orientation of the foldable wing tip. In this way, the exterior aircraft light may provide its desired behavior from readily available data without dedicated control commands. It is possible that the momentary values of the warning light control signal, such as the momentary voltage values of the warning light control signal, are indicative of the momentary orientations of the foldable wing tip. It is also possible that the momentary orientation of the foldable wing tip is contained in the warning light control signal in any suitable encoded format.

According to a further embodiment, the warning light control signal contains a warning light output command, in response to which the control unit is configured to operate the light source to emit the warning light output. The warning light output command may for example be a binary command, which indicates whether a movement of the foldable wing tip takes place or not. In this way, the complexity of the control unit may be kept low, and a straightforward generation of the warning light output in accordance with the warning light output command may be achieved.

According to a further embodiment, the exterior aircraft light comprises an orientation sensor, configured to detect an orientation of the exterior aircraft light and to provide the warning light control signal. This embodiment is particularly beneficial for an exterior aircraft light that is arranged in the foldable wing tip of the aircraft. In this case, the orientation sensor may detect the orientation of the foldable wing tip by detecting the orientation of the aircraft navigation light and may directly provide this information in the form of the warning light control signal. The control unit may deduce the movement of the foldable wing tip between the folded up position and the laterally extended position therefrom. With the help of the orientation sensor, a completely autonomous operation of the warning light output may be achieved within the exterior aircraft light, without the need for additional external control commands.

According to a further embodiment, the orientation sensor in an inertial sensor. In particular, the orientation sensor may be an accelerometer. The orientation sensor may use the gravitational forces of the earth to determine which orientation the exterior aircraft light has.

According to a further embodiment, the exterior aircraft light comprises a control signal input for receiving the warning light control signal from outside the exterior aircraft light. The warning light control signal may be received from an aircraft board computer or from a pilot wing tip controller or from any other suitable entity within the aircraft that has information about the movement of the foldable wing tip. In this way, information available in another entity of the aircraft may be re-used for the warning light control signal. Also, the exterior aircraft light may reliably emit the warning light output with comparably low complexity.

According to a further embodiment, the exterior aircraft light is configured to be arranged in a wing of an aircraft. In particular, the exterior aircraft light may have a size, weight, and design that fits into the wing of an aircraft. The exterior aircraft light may have a lens cover that blends into the aerodynamic contour of the wing. In a particular embodiment, the exterior aircraft light may be configured to be arranged in the foldable wing tip of the wing. It is also possible that the exterior aircraft light is configured to be arranged in the main wing portion of the wing.

According to a further embodiment, the exterior aircraft light is one of a combined navigation and wing tip movement warning light, a combined anti-collision and wing tip movement warning light, and a combined navigation and anti-collision and wing tip movement warning light. In this way, the functionality of emitting a warning light output for indicating the movement of the foldable wing tip may be included into an aircraft navigation light or into an aircraft anti-collision light or into a combined aircraft navigation and anti-collision light. This in turn allows for providing the functionality of the warning light output for indicating the movement of the foldable wing tip, without requiring more space or with only slightly increasing the space envelope of an aircraft navigation and/or anti-collision light. The light source of the exterior aircraft light, which is operated for emitting the warning light output, may be embedded into the structure of the navigation light or the anti-collision light. For example, the light source for the warning light output may be arranged adjacent to a light source providing the navigation light output, with the optical system for shaping the navigation light output also affecting the light of the light source for the warning light output. In this way, the warning light output may have a light intensity distribution similar to a navigation light output of an aircraft navigation light. Such a light intensity distribution may be particularly effective for the warning light output, because it covers an angular range of 110°, measured from the direction of flight, in a horizontal cross-sectional plane. This angular range may provide a particularly effective warning around the foldable wing tip that is being moved. Analogous considerations apply to the combined anti-collision and wing tip movement warning light and to the combined navigation and anti-collision and wing tip movement warning light. The term navigation light may in particular refer to a forward navigation light, as commonly provided in the wings of aircraft, such as in the wing tips or close thereto. Also, the term anti-collision light may refer to a anti-collision light arranged in the wing of an aircraft.

Exemplary embodiments of the invention further include an aircraft wing, comprising a main wing portion; a foldable wing tip, which is rotatable with respect to the main wing portion; and an exterior aircraft light in accordance with any of the embodiments described above. The exterior aircraft light is arranged in the aircraft wing. In particular, the exterior aircraft light may have a housing mounted to the aircraft wing and a lens cover that blends into the aerodynamic contour of the aircraft wing. The light from the light source is emitted through the lens cover for providing the warning light output. The additional features, modifications, and beneficial effects, described above with respect to the exterior aircraft light, apply to the aircraft wing in an analogous manner.

According to a further embodiment, the exterior aircraft light is arranged in the foldable wing tip. In particular, the exterior aircraft light may be arranged substantially along the leading edge of the foldable wing tip. In this way, the exterior aircraft light may emit the warning light output both into the hemisphere below the aircraft wing and the hemisphere above the aircraft wing. It is also possible that the exterior aircraft light is arranged on an underside of the foldable wing tip. In this way, the warning light output is highly visible when the foldable wing tip is in a folded up position. It may thus generate a large amount of attention at the beginning of the movement of the foldable wing tip from the folded up position to the laterally extended position.

According to a further embodiment, the exterior aircraft light is arranged in the main wing portion. In this way, the warning light output may be provided without the need to provide the exterior aircraft light in the delicate component of the foldable wing tip and without the need to provide additional power to the foldable wing tip. The exterior aircraft light may in particular be arranged adjacent to the foldable wing tip. In this way, the warning light output is provided from a position close to where the movement of the foldable wing tip takes place. The term adjacent may refer to a position of the exterior aircraft light that is within 20%, in particular within 10%, further in particular within 5% of the wing span of the main wing portion, when seen from the connection point between the main wing portion and the foldable wing tip. The exterior aircraft light may in particular be arranged substantially right next to the foldable wing tip, such as right next to a hinge assembly between the main wing portion and the foldable wing tip.

Exemplary embodiments of the invention further include an aircraft comprising an aircraft wing as described in any of the embodiments above. The aircraft may be an air plane or a helicopter or any other aircraft having a foldable wing tip. In particular, the aircraft may be an air plane having a right wing and a left wing in accordance with any of the embodiments described above.

Exemplary embodiments of the invention further include a method of operating an exterior aircraft light for indicating a movement of a foldable wing tip between a folded up position and a laterally extended position, the method comprising obtaining a warning light control signal indicative of the movement of the foldable wing tip; and emitting a warning light output in response to the warning light control signal. The modifications, additional features, and beneficial effects, described above with respect to the exterior aircraft light, apply to the method of operating an exterior aircraft light in an analogous manner. Method steps analogous to the properties of the exterior aircraft light as described above are explicitly disclosed herewith. The term obtaining the warning light control signal encompasses all of receiving the warning light control signal, generating the warning light control signal within the exterior aircraft light, and partly receiving information and partly generating information, which jointly form the warning light control signal.

According to a further embodiment, emitting the warning light output comprises emitting a sequence of warning light flashes.

According to a further embodiment, the warning light output is of an orange or yellow color.

According to a further embodiment, emitting the warning light output comprises emitting the warning light output from a position on the foldable wing tip. Alternatively, emitting the warning light output may comprise emitting the warning light output from a position on a main wing portion of an aircraft wing, in particular from a position on the main wing portion of the aircraft wing adjacent the foldable wing tip.

BRIEF DESCRIPTION OF THE DRAWINGS

Further exemplary embodiments of the invention are described below with respect to the accompanying drawings, wherein.

DETAILED DESCRIPTION

Figure 1:
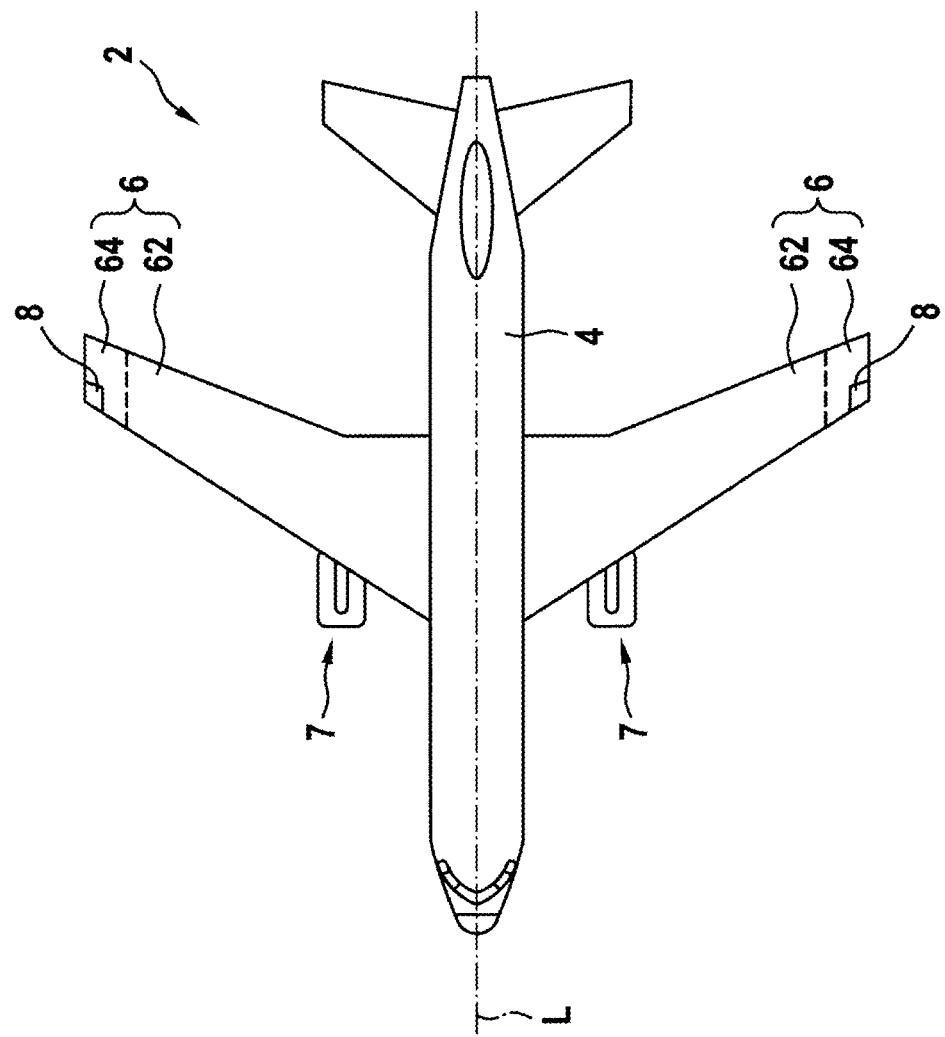
FIG. 1 shows a schematic top view of an aircraft in accordance with an exemplary embodiment of the invention, the aircraft being equipped with two exterior aircraft lights, arranged in the wing tips of the wings, in accordance with exemplary embodiments of the invention.

FIG. 1 shows a schematic top view of an aircraft 2, in particular an air plane 2, comprising a fuselage 4 and two wings 6 extending laterally from the fuselage 4. An engine 7 is mounted to each of the wings 6, respectively. The air plane 2 is substantially symmetric with respect to its longitudinal axis L. Each of the wings 6 has a main wing portion 62 and a foldable wing tip 64. In particular, the right wing 6 has a right main wing portion 62 and a right foldable wing tip 64, and the left wing 6 has a left main wing portion 62 and a left foldable wing tip 64. Respective hinge assemblies between the main wing portions 62 and the foldable wing tips 64 are indicated with dashed lines in FIG. 1.

The aircraft 2 is provided with two exterior aircraft lights 8 mounted to the foldable wing tips 64 of the wings 6. The exterior aircraft lights 8 are in accordance with exemplary embodiments of the invention. Each of the exterior aircraft lights 8 is configured to provide a warning light output for indicating a movement of the foldable wing tip 64, to which the respective exterior aircraft light 8 is mounted. This will be laid out in more detail below.

In the exemplary embodiment of FIG. 1, the exterior aircraft lights 8 are combined navigation and wing tip movement warning lights. In other words, each of the exterior aircraft lights 8 provides both the functionality of a forward navigation light and the functionality of emitting a warning light output for indicating the movement of the foldable wing tip. This will also be laid out in more detail below.

Figure 2:
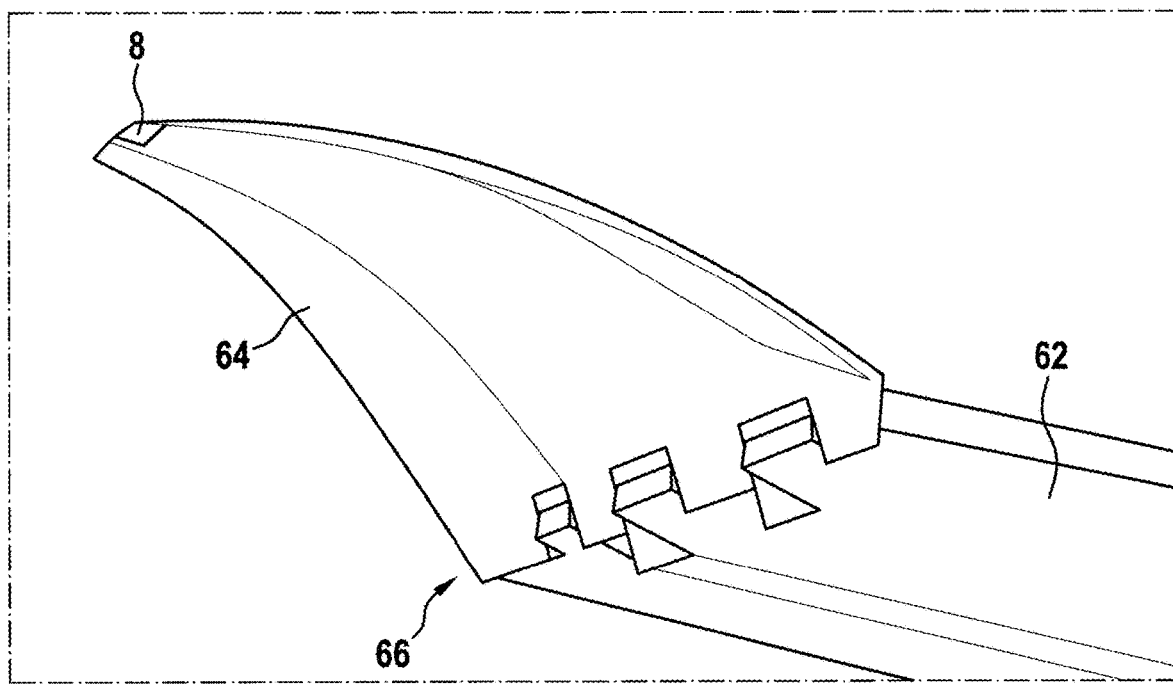
FIG. 2 shows a perspective view of a foldable wing tip and a part of a main wing portion of an aircraft wing in accordance with an exemplary embodiment of the invention, the foldable wing tip being equipped with an exterior aircraft light in accordance with an exemplary embodiment of the invention.

FIG. 2 shows a perspective view of a right foldable wing tip 64 and a part of a right main wing portion 62 of an aircraft wing in accordance with an exemplary embodiment of the invention. A hinge assembly 66 is provided between the main wing portion 62 and the foldable wing tip 64. The hinge assembly allows for moving the foldable wing tip 64 between a folded up position and a laterally extended position with respect to the main wing portion 62. FIG. 2 shows an intermediate position during the transition from the folded up position of the foldable wing tip 64 to the laterally extended position of the foldable wing tip 64. By folding up the foldable wing tip 64 on the ground, the wing span of the aircraft may be reduced, making the taxiing on an airport easier and saving parking space at the gate or on the airfield.

In the depicted embodiment of FIG. 2, the hinge assembly 66 is comprised of various hinge parts both on the side of the main wing portion 62 and on the side of the foldable wing tip 64, which mesh in a tooth-like manner. The hinge parts are engaged with each other via a mounting rod or similar structure. The foldable wing tip 64 is rotatable with respect to the main wing portion 62.

The foldable wing tip 64 is equipped with an exterior aircraft light 8 in accordance with an exemplary embodiment of the invention. In the depicted embodiment, the exterior aircraft light 8 is arranged close to the lateral outer end of the foldable wing tip 64 and in a front edge region thereof. The exterior aircraft light 8 may also be arranged in other parts of the foldable wing tip 64. The exterior aircraft light 8 has a lens cover, e.g. a transparent plastics cover for light emission therethrough, which is aerodynamically shaped and which blends into the aerodynamic contour of the foldable wing tip 64. The exterior aircraft light 8 may be provided for the sole function of emitting the warning light output for indicating the movement of the foldable wing tip 64. Alternatively, the exterior aircraft light 8 may be a combined navigation and wing tip movement warning light or a combined anti-collision and wing tip movement warning light or a combined navigation and anti-collision and wing tip movement warning light.

Figure 3A:
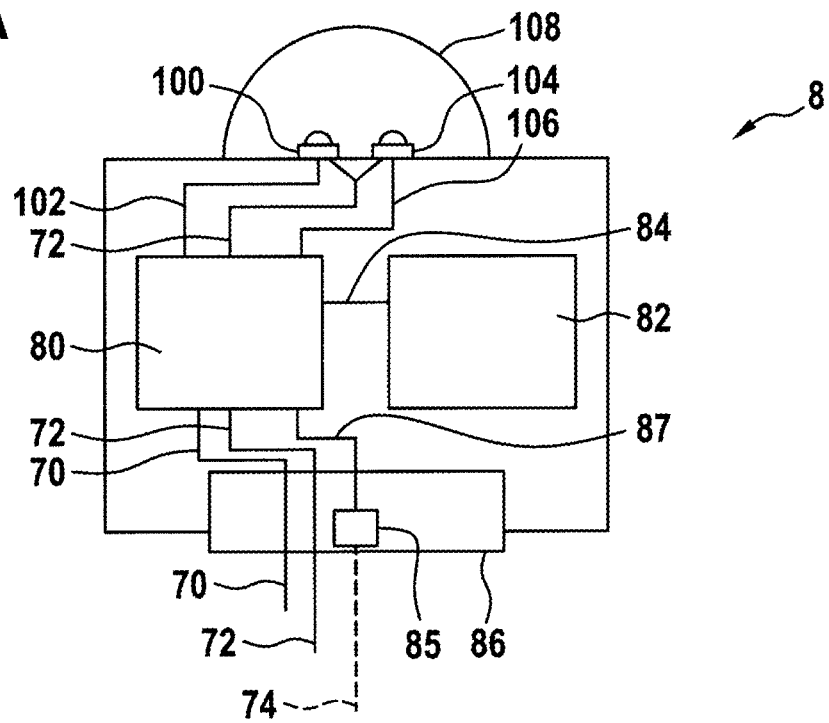
FIG. 3A shows a block diagram of exterior aircraft lights in accordance with an exemplary embodiment of the invention.

FIG. 3A shows an exterior aircraft light 8 in accordance with an exemplary embodiment of the invention. The exterior aircraft light 8 of FIG. 3A is a combined navigation and wing tip movement warning light, configured for being arranged in a right wing tip of an aircraft wing. The exterior aircraft light 8 of FIG. 3A may be used as an exterior aircraft light 8 in the embodiments of FIGS. 1 and 2.

The exterior aircraft light 8 has a first light source 100, the operation of which results in the emission of a warning light output for indicating the movement of the foldable wing tip. The first light source is an orange LED. The exterior aircraft light 8 further has a second light source 104, the operation of which results in the emission of a navigation light output in accordance with the requirements for a right forward navigation light, as laid out in the Federal Aviation Regulations (FAR). The second light source is a green LED. The exterior aircraft light 8 further comprises an optical system 108, which shapes the light intensity distribution of the warning light output and of the navigation light output. The optical system 108 is schematically depicted as a semi-spherical structure over the first light source 100 and the second light source 104. A potential implementation of the optical system 108 will be described below with respect to FIG. 4.

The exterior aircraft light 8 further has a control unit 80, an orientation sensor 82, and a power and control interface 86. The power and control interface 86 is configured to be connected to a power line 70, such as a power supply line of an aircraft on-board electricity distribution network, to a ground connection 72, and to an external command line 74. In particular, the power and control interface 86 has a control signal input 85 for receiving control signals over the external command line 74. The power and control interface 86 is coupled to the control unit 80. The power line 70 and the ground connection 72 are passed on to the control unit 80 via the power and control interface 86. The control signal input 85 is coupled to the control unit 80 via a first control signal line 87. The power and control interface 86 may provide suitable connectors between the outside and the inside of the exterior aircraft light 8 only. It is also possible that the power and control interface 86 provides filter circuits for the inputs of the power line 70, the ground connection 72, and the external command line 74 and/or that the power and control interface 86 provides suitable safety circuitry between the inside and the outside of the exterior aircraft light 8.

The control unit 80 is coupled to the first light source 100 via a first power supply line 102 and coupled to the second light source 104 via a second power supply line 106. Also, the control unit 80 is coupled to the first light source 100 and to the second light source 104 via ground connection 72. In this way, the control unit 80 is able to selectively provide power to the first light source 100 and to the second light source 104.

The orientation sensor 82 is coupled to the control unit 80 via a second control signal line 84. In operation, the orientation sensor 82 generates a warning light control signal and provides said warning light control signal to the control unit 80 via the second control signal line 84. In particular, the orientation sensor 80 is configured to sense the orientation of the exterior aircraft light 8 and provides a warning light control signal to the control unit 80 on the basis of the sensed orientation of the exterior aircraft light 8.

In the exemplary embodiment of FIG. 3A, the warning light control signal is indicative of the movement of the foldable wing tip, in which the exterior aircraft light 8 is arranged. In particular, the warning light control signal is indicative of the momentary orientation of the foldable wing tip. The control unit 80 is configured to determine from the warning light control signal over time, whether the foldable wing tip is currently in motion or not. The control unit 80 is further configured to supply the first light source 100 with power via the first power supply line 102 for effecting the warning light output of the exterior aircraft light 8, in case it is determined that the foldable wing tip is in motion. In particular, the control unit 80 is configured to provide an intermittent power flow to the first light source 100 for effecting a sequence of orange warning light flashes.

With the exterior aircraft light 8 being arranged in the foldable wing tip of the aircraft wing, the orientation sensor 82 senses the movement of the foldable wing tip by sensing the movement of the exterior aircraft light 8. In particular, the orientation sensor 82 may sense a rotation angle of the exterior aircraft light 8 with respect to a rotation axis. The orientation sensor 82 may be an inertial sensor or any other suitable kind of orientation sensor.

In operation, the control unit 80 further receives navigation light control commands via the external command line 74 and the first control signal line 87. If navigation lighting functionality is requested via the external command line 74, the control unit 80 supplies power to the second light source 104 via the second power supply line 106. This results in a green navigation light output. It is possible that the external command line 74 is not only used for commands regarding the navigation lighting functionality, but also for commands regarding the warning light output. For example, external override commands may be received via the external command line 74, which may supersede the warning light control signal, as received over the second control signal line 84.

Figure 3B:
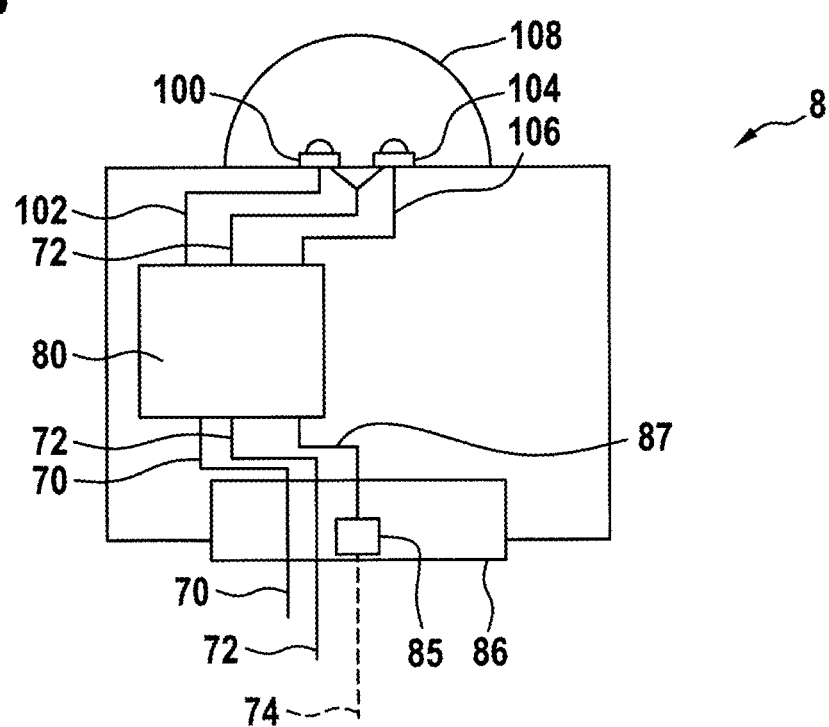
FIG. 3B shows a block diagram of exterior aircraft lights in accordance with an exemplary embodiment of the invention.

FIG. 3B shows a block diagram of an exterior aircraft light 8 in accordance with another exemplary embodiment of the invention. The exterior aircraft light 8 of FIG. 3B is similar to the exterior aircraft light 8 of FIG. 3A, with like elements having like reference numerals. Reference is made to the description thereof with respect to FIG. 3A. The exterior aircraft light 8 of FIG. 3B does not have an orientation sensor. Instead, the control commands for both the navigation lighting functionality and the warning light functionality for indicating the movement of the foldable wing tip are received from outside of the exterior aircraft light 8 via the control signal input 85. In other words, both a warning light control signal as well as a navigation light control signal are received via the control signal input 85. The two kinds of commands may be integrated into a single control signal in any suitable manner. It is also possible that the control signal input 85 has two pins for receiving the two kinds of commands on separate lines.

Figure 4A:
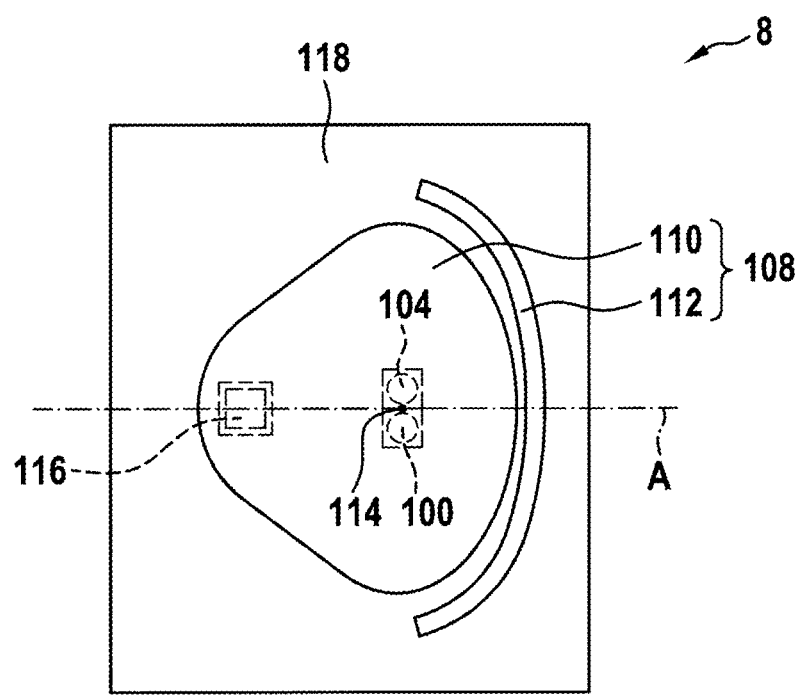
FIG. 4A shows a schematic side view of selected components of an exterior aircraft light in accordance with an exemplary embodiment of the invention.
Figure 4B:
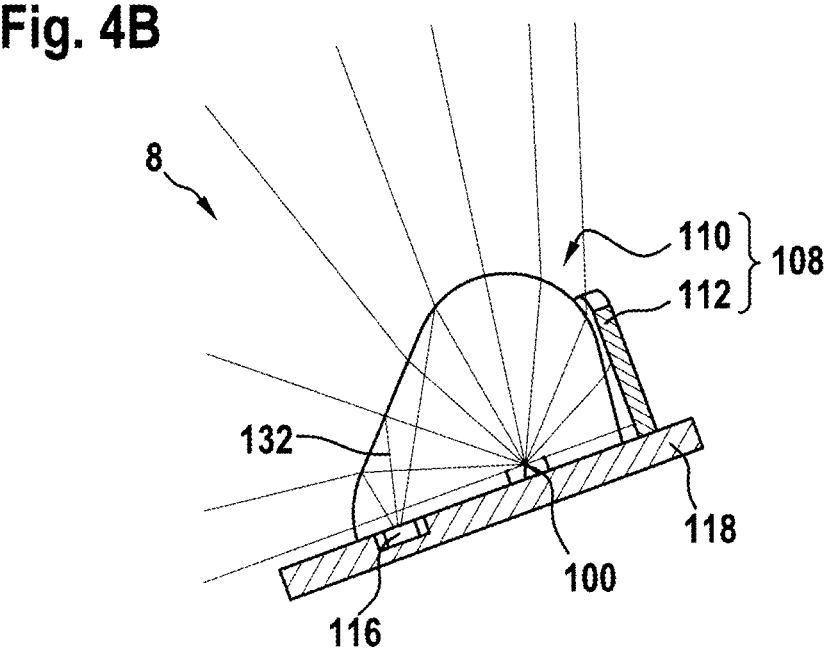
FIG. 4B shows a schematic cross-sectional view of selected components of an exterior aircraft light in accordance with an exemplary embodiment of the invention.

FIG. 4A shows a schematic side view of selected components of an exterior aircraft light 8 in accordance with an exemplary embodiment of the invention. FIG. 4B shows a schematic cross-sectional view of the selected components of FIG. 4A, with the cross-sectional plane being indicated with reference character A in FIG. 4A. The exterior aircraft light 8 of FIG. 4 may be an exterior aircraft light 8, as generally described with respect to FIGS. 1 to 3. While FIG. 4 shows the exterior aircraft light as arranged on a left side of the aircraft, it is understood that a mirror-symmetric version of the exterior aircraft light 8 may be used on the right side of the aircraft. The left and right versions of the exterior aircraft light may only differ with respect to the color of the second light source. The cross-sectional plane of FIG. 4B is a horizontal cross-sectional plane in the aircraft frame of reference, with the direction of flight being towards the top in the drawing plane of FIG. 4B.

The exterior aircraft light 8 comprises a first light source 100, a second light source 104, and an optical system 108, as described above. The first light source 100, the second light source 104, and the optical system 108 are arranged on a common support structure 118. The exterior aircraft light 8 further comprises a wear detector 116, also arranged on the common support structure. In the exemplary embodiment of FIG. 4, the optical system 108 comprises a lens 110 and a shutter 112. The lens 110 is arranged over and tightly encloses the first light source 100 and the second light source 104. In particular, the lens 110 may be overmolded over the first light source 100 and the second light source 104.

The optical system 108, comprising the lens 110 and the shutter 112, is configured to generate a navigation light output that extends over an angle of 110° in the horizontal plane and that extends over an angle of about 180° in the vertical plane. The shutter 112 is configured to block any light towards the sector of the analogous exterior aircraft light, arranged on the right side of the aircraft. In order to provide an efficient light output over an angular range of 110° with the arrangement of FIG. 4, the common support structure 118 is angled with respect to the transverse direction in the aircraft frame of reference, as shown in FIG. 4B.

The shutter 112 and the lens 110 are formed symmetrically with respect to a plane of symmetry, running through a reference point 114 and being orthogonal to the common support structure 118. This plane of symmetry is oriented horizontally, when the exterior aircraft light 8 is mounted to the aircraft 2. The optical system 108, including the lens 110 and the shutter 112, is designed for shaping the light emitted by a light source which is arranged at the reference point 114.

In the embodiment shown, none of the first and second light sources 100, 104 is arranged exactly at said reference point 114. Instead, the first and second light sources 100, 104 are arranged symmetrically with respect to the plane of symmetry at the same distance from the reference point 114. It is also possible that both the first light source 100 and the second light source 104 are arranged along the plane of symmetry.

The optical system 108 is designed so that small deviations of the positions of the light sources from the reference point 114 do not considerably deteriorate the quality of the light output of the exterior aircraft light 8. In order to achieve this feature, the extension of the first optical system 108 may be at least an order of magnitude greater than the distance between the centers of the first and second light sources 100, 104. In other words, the first and second light sources 100, 104 may be arranged very close to each other, as compared to the extension of the optical system 108. For example, the optical system 108 may have an extension of between 20 mm and 50 mm, while the distance between the centers of the first and second light sources 100, 104 may be in the range of between 1 mm and 5 mm. In this way, both the navigation light output and the warning light output for indicating the movement of the foldable wing tip may have similar or substantially the same light intensity distributions, potentially scaled due to the different light intensities of the first and second light sources 100, 104 or due to the different levels of power supplied to the first and second light sources 100, 104.

In this way, the warning light output has a light intensity distribution that extends over an angle of 110° in the horizontal plane and that extends over an angle of about 180° in the vertical plane. Such a warning light output allows for providing an effective warning in a large angular range around the foldable wing tip of the aircraft wing. It is stressed, however, that such a light intensity distribution is exemplary only and that various other suitable light intensity distributions are possible as well.

As stated above, a wear detector 116, which is a photo detector, is mounted to the common support structure 118. The wear detector 116 is also covered and tightly encased with respect to the common support structure 118 by the lens 110. In the depicted exemplary embodiment, the wear detector 116 is arranged around the plane of symmetry A. As a result, the first and second light sources 100, 104 are arranged symmetrically with respect to the wear detector 116. It is pointed out that the wear detector is an entirely optional element and may also be dispensed with.

In a region close to the shutter 112, which is depicted on the right side in FIG. 4, the lens 110 has a curved portion with a curved cross-section. In a region more distant from the shutter 112, i.e. in a region more to the left in FIG. 4, the lens 110 has a linear portion with a linear cross-section. A portion 132 of the light emitted by the first and second light sources 100, 104 is reflected by this linear portion of the lens 110 towards the wear detector 116. Based on the amount of reflected light, which is detected by the wear detector 116, the wear state of each of first and second light sources 100, 104 may be determined. The linear portion of the lens 110 may be partially refractive and partially reflective for the given incident angles of the light from the first and second light sources 100, 104. The majority of the light form the first and second light sources leaves the lens 110 and forms the warning light output and the navigation light output, respectively. It is pointed out that the given shape/design of the lens 110 is exemplary only and that various other shapes/designs may be provided.

Figure 5:
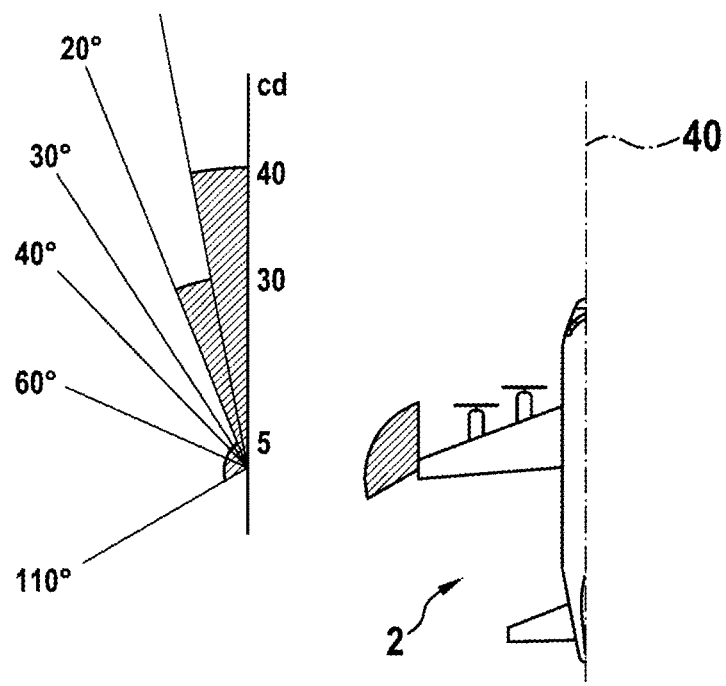
FIG. 5 illustrates the light intensity distribution of a left forward navigation light, as required by the Federal Aviation Regulations (FAR)

FIG. 5 illustrates the light intensity distribution of a left forward navigation light, as required by the Federal Aviation Regulations (FAR). In particular, FIG. 5 shows, on the right hand side, a schematic illustration of an air plane 2, having a longitudinal axis 40, coinciding with the nominal direction of flight. The light output of the left forward navigation light is indicated with a hatched sector around the left wing tip of the air plane 2. The required FAR light intensity values for forward navigation lights, as set out in FAR section 25.1391 for the horizontal plane, are depicted on the left side of FIG. 5. The FAR requirements cover an angular range between the longitudinal axis of the aircraft and an angle of 110° thereto. It is illustrated that the output light intensity distribution has three distinct output regions, namely a peak region of at least 40 cd between the longitudinal axis of the airplane and an angle of 10° thereto, a medium light intensity region of at least 30 cd between 10° and 20°, and a low light intensity region of at least 5 cd between 20° and 110°. The combined navigation and wing tip movement warning light, as described herein, has a navigation light output that fulfills these requirements.

Figure 6:
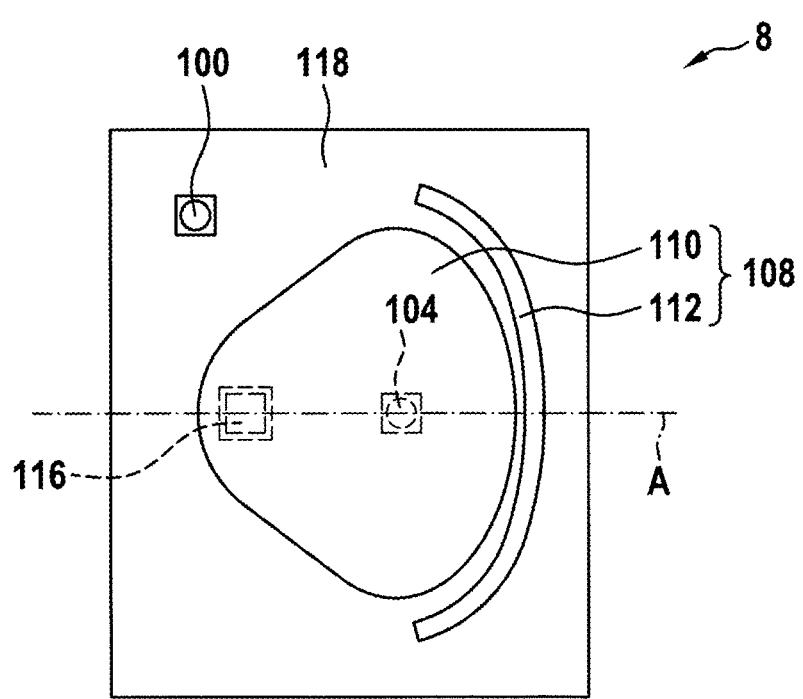
FIG. 6 shows a schematic side view of selected components of an exterior aircraft light in accordance with a further exemplary embodiment of the invention.

FIG. 6 shows a schematic side view of selected components of an exterior aircraft light 8 in accordance with a further exemplary embodiment of the invention. The exterior aircraft light 8 of FIG. 6 is a modification of the exterior aircraft light 8, as shown in FIG. 4. Only a view corresponding to the side view of FIG. 4A is shown in FIG. 6. Reference is made to above description of FIG. 4 for the description of the general structure of the exterior aircraft light 8. The exterior aircraft light 8 of FIG. 6 differs from the exterior aircraft light 8 of FIG. 4 in that only the second light source 104 is arranged below the lens 110. The first light source 100 is arranged on the common support structure 118, spaced from the second light source 104 and spaced from the optical system 108. In this way, the light from the first light source 100 is not conditioned by the optical system 108 in the way the light from the second light source 104 is conditioned. The light from the first light source 100 may be emitted by the aircraft navigation light 8, without being conditioned by an optical system. Alternatively, a separate optical system may be provided for conditioning the light output from the first light source 100. The separate optical system may have one or more lenses and/or one or more reflectors and/or one or more shutters.

Figure 7A:
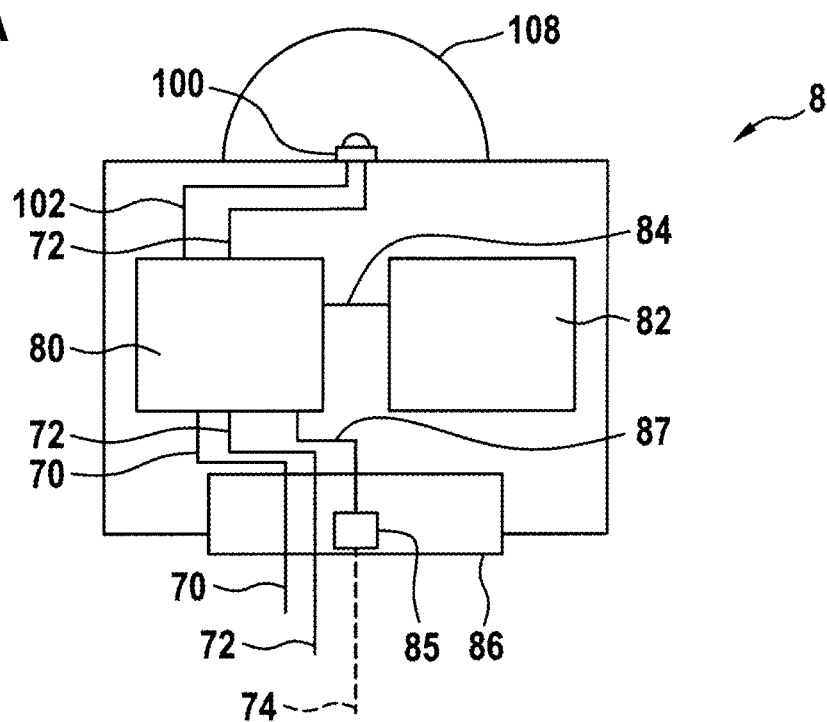
FIG. 7A shows a block diagrams of exterior aircraft lights in accordance with a further exemplary embodiment of the invention.
Figure 7B:
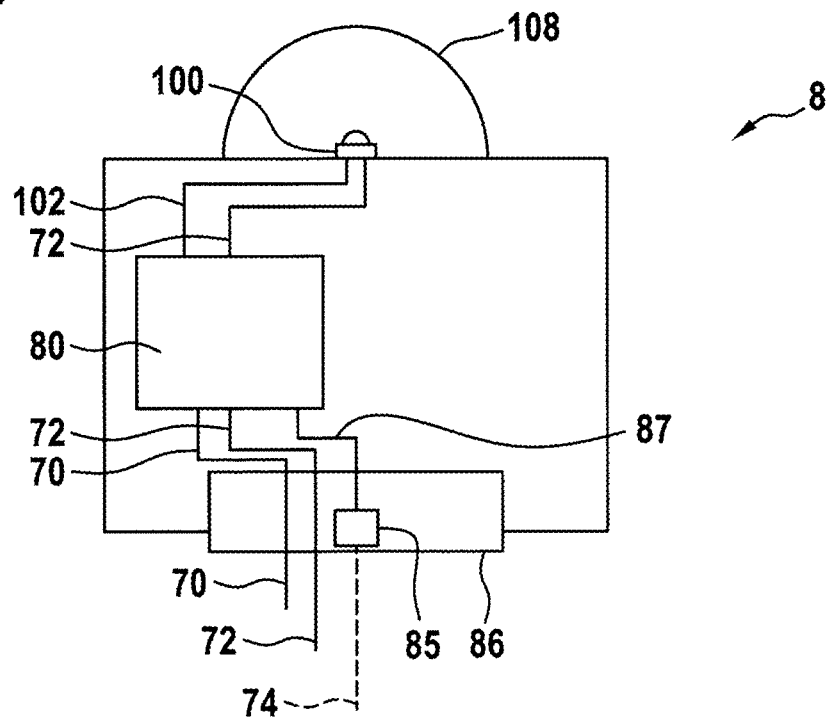
FIG. 7B shows a block diagrams of exterior aircraft lights in accordance with a further exemplary embodiment of the invention.

FIG. 7 shows block diagrams of two exterior aircraft lights 8 in accordance with two further exemplary embodiments of the invention. The exterior aircraft lights 8 are modifications of the exterior aircraft lights 8 of FIG. 3. In particular, the exterior aircraft light 8 of FIG. 7A is a modification of the exterior aircraft light of FIG. 3A, and the exterior aircraft light 8 of FIG. 7B is a modification of the exterior aircraft light of FIG. 3B. The exterior aircraft lights 8 of FIG. 7 differ from the exterior aircraft lights of FIG. 3 in that they are sole purpose exterior aircraft light, configured for the provision of the warning light output only. In particular, both of the exterior aircraft lights 8 of FIG. 7 have the first light source 100, while neither of the exterior aircraft lights 8 of FIG. 7 has the second light source 104. The exterior aircraft lights of FIG. 7 are dedicated to the use as wing tip movement warning lights only. With respect to the individual features and with respect to the operation of the exterior aircraft lights 8 of FIG. 7, reference is made to above description of FIG. 4.

Figure 8:
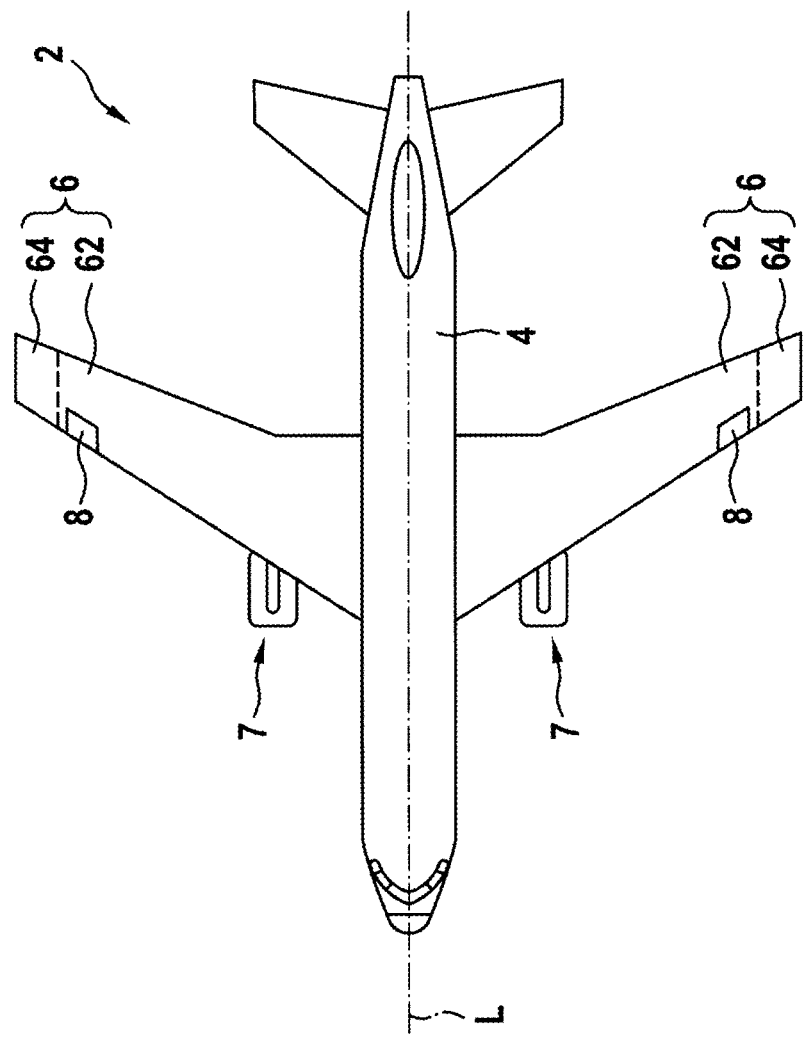
FIG. 8 shows a schematic top view of an aircraft in accordance with an exemplary embodiment of the invention, the aircraft being equipped with two exterior aircraft lights, arranged in the main wing portions of the wings, in accordance with exemplary embodiments of the invention.

FIG. 8 shows a schematic top view of an aircraft 2, in particular an air plane 2, equipped with two exterior aircraft lights 8 in accordance with exemplary embodiments of the invention. The aircraft 2 of FIG. 8 is similar to the aircraft 2 of FIG. 1. Like elements are denoted with like reference numerals, and reference is made to the description thereof above. The aircraft 2 of FIG. 8 differs from the aircraft 2 of FIG. 1 in that the exterior aircraft lights 8 are arranged in-board of the foldable wing tips 64. In particular, the exterior aircraft lights 8 of the aircraft of FIG. 8 are arranged in a front edge of the main wing portions 62 of the aircraft wings 6, adjacent to the foldable wing tips 64. In this way, the exterior aircraft lights 8 are able to emit the warning light output for indicating a movement of the foldable wing tips 64 from the main wing portions 62. The emission of the warning light output comes from a position that is a very good indication of the wing span of the aircraft, when the foldable wing tips are in a folded up position.

Figure 9:
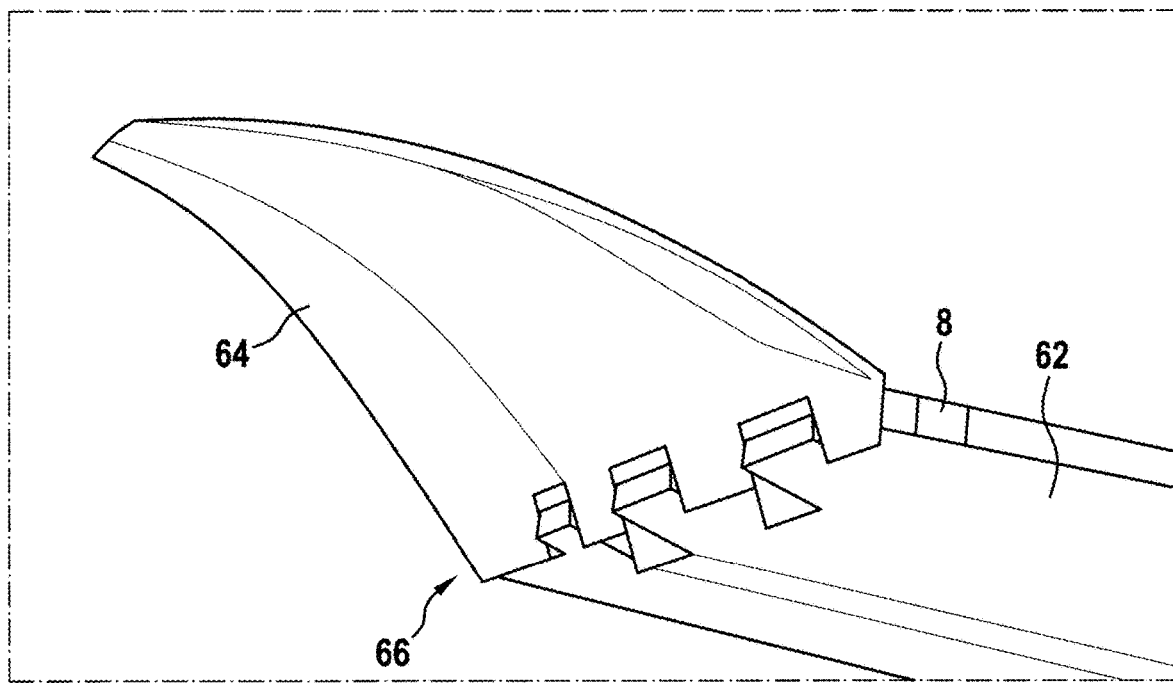
FIG. 9 shows a perspective view of a foldable wing tip and a part of a main wing portion of an aircraft wing in accordance with an exemplary embodiment of the invention, the main wing portion of the aircraft wing being equipped with an exterior aircraft light in accordance with an exemplary embodiment of the invention.

FIG. 9 shows a perspective view of a right foldable wing tip 64 and a part of a right main wing portion 62 of an aircraft wing in accordance with an exemplary embodiment of the invention. The aircraft wing of FIG. 9 is similar to the aircraft wing of FIG. 2. Like elements are denoted with like reference numerals, and reference is made to the description thereof above. The aircraft wing of FIG. 9 differs from the aircraft wing of FIG. 2 in that the exterior aircraft light 8 is arranged in-board of the foldable wing tip 64.

The exterior aircraft lights 8, as described with respect to FIGS. 3B and 7B, are particularly suitable for the aircraft 2 of FIG. 8 and the aircraft wing of FIG. 9. They are configured to receive the warning light control signal from outside of the exterior aircraft light 8 and control the light source to emit the warning light output in response thereto. The exterior aircraft lights 8 of FIGS. 3B and 7B do not rely on determining the orientation of the foldable wing tip via an orientation sensor, hence they are well-suited for operation in the main wing portions of the wings of an aircraft.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light for indicating a movement of a foldable wing tip between a folded up position and a laterally extended position, comprising:
   a light source, and
   a control unit;
   wherein the control unit is configured to operate the light source to emit a warning light output in response to a warning light control signal indicative of the movement of the foldable wing tip; and
   wherein the exterior aircraft light is configured to be arranged in the foldable wing tip and configured to emit the warning light output from the foldable wing tip as a visual signal that the foldable wing tip is moved between the folded up position and the laterally extended position;
   or
   wherein the exterior aircraft light is configured to be arranged in a main wing portion of an aircraft wing and configured to emit the warning light output from the main wing portion as a visual sign that the foldable wing tip is moved between the folded up position and the laterally extended position.

2. The exterior aircraft light according to claim 1, wherein the warning light output comprises a sequence of warning light flashes.

3. The exterior aircraft light according to claim 1, wherein the warning light output is of an orange or yellow color.

4. The exterior aircraft light according to claim 1, wherein the warning light control signal is indicative of a momentary orientation of the foldable wing tip and wherein the control unit is configured to determine the movement of the foldable wing tip from the course of the warning light control signal over time.

5. The exterior aircraft light according to claim 1, wherein the warning light control signal contains a warning light output command, in response to which the control unit is configured to operate the light source to emit the warning light output.

6. The exterior aircraft light according to claim 1, further comprising an orientation sensor, configured to detect an orientation of the exterior aircraft light and to provide the warning light control signal.

7. The exterior aircraft light according to claim 1, further comprising a control signal input for receiving the warning light control signal from outside the exterior aircraft light, such as from an aircraft board computer or from a pilot wing tip controller.

8. The exterior aircraft light according to claim 1, wherein the exterior aircraft light is one of a combined navigation and wing tip movement warning light, a combined anti-collision and wing tip movement warning light, and a combined navigation and anti-collision and wing tip movement warning light.

9. An aircraft wing, comprising:
   a main wing portion;
   a foldable wing tip, which is rotatable with respect to the main wing portion; and
   an exterior aircraft light in accordance with claim 1.

10. An aircraft wing according to claim 9, wherein the exterior aircraft light is arranged in the foldable wing tip.

11. An aircraft wing according to claim 9, wherein the exterior aircraft light is arranged in the main wing portion, with the exterior aircraft light in particular being arranged adjacent to the foldable wing tip.

12. A method of operating an exterior aircraft light for indicating a movement of a foldable wing tip between a folded up position and a laterally extended position, the method comprising:
   obtaining a warning light control signal indicative of the movement of the foldable wing tip, and
   emitting a warning light output in response to the warning light control signal;
   wherein emitting the warning light output comprises emitting the warning light output from a position on the foldable wing tip as a visual signal that the foldable wing tip is moved between the folded up position and the laterally extended position.

13. The method according to claim 12, wherein emitting the warning light output comprises emitting a sequence of warning light flashes.

14. The method according to claim 12, wherein the warning light output is of an orange or yellow color.

15. A method of operating an exterior aircraft light for indicating a movement of a foldable wing tip between a folded up position and a laterally extended position, the method comprising:
   obtaining a warning light control signal indicative of the movement of the foldable wing tip, and
   emitting a warning light output in response to the warning light control signal;
   wherein emitting the warning light output comprises emitting the warning light output from a position on a main wing portion of an aircraft wing as a visual signal that the foldable wing tip is moved between the folded up position and the laterally extended position.

16. The method according to claim 15, wherein the warning light output is emitted from a position on the main wing portion adjacent the foldable wing tip.

17. The method according to claim 15, wherein emitting the warning light output comprises emitting a sequence of warning light flashes.

18. The method according to claim 15, wherein the warning light output is of an orange or yellow color.

* * * * *